(12) United States Patent
Lan

(10) Patent No.: US 10,554,338 B2
(45) Date of Patent: Feb. 4, 2020

(54) DATA PROCESSING METHOD AND RECEIVING DEVICE

(71) Applicant: HUAWEI TECHNOLOGIES CO., LTD., Shenzhen, Guangdong (CN)

(72) Inventor: Haiqing Lan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 71 days.

(21) Appl. No.: 15/856,720

(22) Filed: Dec. 28, 2017

(65) Prior Publication Data
US 2018/0123736 A1  May 3, 2018

Related U.S. Application Data

(63) Continuation of application No. PCT/CN2015/082644, filed on Jun. 29, 2015.

(51) Int. Cl.
*H04L 12/26* (2006.01)
*H04L 1/00* (2006.01)

(52) U.S. Cl.
CPC .......... *H04L 1/0071* (2013.01); *H04L 1/0009* (2013.01); *H04L 1/0041* (2013.01); *H04L 43/0835* (2013.01)

(58) Field of Classification Search
CPC . H04L 1/0071; H04L 1/0041; H04L 43/0835; H04L 1/0009; H04L 12/26; H04L 1/00
See application file for complete search history.

(56) References Cited

U.S. PATENT DOCUMENTS 7,827,458 B1   11/2010   Salsbury et al.
2004/0073939 A1*  4/2004   Ayyagari ............... H04L 29/06
                                                           725/110
(Continued)

FOREIGN PATENT DOCUMENTS

CN      1684445 A     10/2005
CN    101174995 A      5/2008
(Continued)

OTHER PUBLICATIONS

Extended European Search Report dated Apr. 24, 2018 in corresponding European Patent Application No. 15896648.1.
(Continued)

*Primary Examiner* — Chi Ho A Lee
(74) *Attorney, Agent, or Firm* — Kilpatrick Townsend & Stockton LLP

(57) ABSTRACT

Embodiments of the present invention provide a data processing method, including: obtaining, by a receiving device, a first data packet sequence; determining, according to an identifier of a data packet in the first data packet sequence, an identifier of a data packet lost in a transmission process of the transmission system; determining an estimated value of the lost data packet according to a value of the data packet in the first data packet sequence; combining the value of the data packet in the first data packet sequence with the estimated value of the lost data packet as a second data packet sequence corresponding to the source data packet sequence; and performing digital signal processing on the second data packet sequence.

16 Claims, 3 Drawing Sheets

(56) References Cited

U.S. PATENT DOCUMENTS

| | | | |
|---|---|---|---|
| 2005/0089083 A1* | 4/2005 | Fisher | H04B 1/7075 375/130 |
| 2005/0165948 A1* | 7/2005 | Hatime | H04L 47/10 709/235 |
| 2005/0220088 A1 | 10/2005 | Smith et al. | |
| 2005/0232276 A1 | 10/2005 | Glaser | |
| 2007/0094009 A1 | 4/2007 | Ryu et al. | |
| 2010/0074126 A1 | 3/2010 | Chen et al. | |
| 2010/0091801 A1 | 4/2010 | Itakura et al. | |
| 2010/0094642 A1* | 4/2010 | Zhan | G10L 19/005 704/500 |
| 2010/0158183 A1 | 6/2010 | Hadzic et al. | |
| 2011/0110260 A1* | 5/2011 | Yoneda | H04L 12/1827 370/252 |
| 2012/0294164 A1* | 11/2012 | Leventu | H04L 43/0829 370/252 |
| 2014/0092205 A1 | 4/2014 | Qiu et al. | |
| 2015/0095739 A1* | 4/2015 | Zhovnirnovsky | H03M 13/616 714/759 |
| 2015/0106106 A1 | 4/2015 | Atti et al. | |
| 2015/0117176 A1* | 4/2015 | Jeon | H04L 49/552 370/216 |
| 2015/0222555 A1* | 8/2015 | Rickeby | H04L 47/34 370/230 |
| 2015/0236819 A1* | 8/2015 | Zhovnirnovsky | H04L 1/08 370/216 |
| 2017/0134251 A1* | 5/2017 | Quan | H04B 17/29 |
| 2018/0035404 A1* | 2/2018 | Akopian | H04L 1/1685 |

FOREIGN PATENT DOCUMENTS

| | | |
|---|---|---|
| CN | 101542957 | 9/2009 |
| CN | 101690204 | 3/2010 |
| CN | 101895466 A | 11/2010 |
| CN | 104159166 | 11/2014 |

OTHER PUBLICATIONS

International Search Report dated Mar. 24, 2016 in corresponding International Patent Application No. PCT/CN2015/082644.

International Search Report, dated Mar. 24, 2016, in International Application No. PCT/CN2015/082644 (4 pp.).

Written Opinion of the International Searching Authority, dated Mar. 24, 2016, in International Application No. PCT/CN2015/082644 (7 pp.).

* cited by examiner

DATA PROCESSING METHOD AND RECEIVING DEVICE

CROSS-REFERENCE TO RELATED APPLICATIONS

This application is a continuation of International Application No. PCT/CN2015/082644, filed on Jun. 29, 2015, which is hereby incorporated by reference in its entirety.

TECHNICAL FIELD

Embodiments of the present invention relate to the communications field, and more specifically, to a data processing method and a receiving device.

BACKGROUND

In a modern digital communications system, a source device generates a digital signal that indicates analog signal amplitude, and sends the digital signal to a target device in a form of data by using a transmission system. The target device converts the digital signal into an analog signal, or uses the digital signal to perform digital signal processing. A most typical application is an IQ signal in a common public radio interface (Common Public Radio Interface, CPRI) specification. In a downlink direction, as a source device, a radio equipment controller (Radio Equipment Controller, REC) transmits an IQ signal to radio equipment (Radio Equipment, RE), and the RE converts the digital signal into an analog signal. In an uplink direction, as a source device, the RE converts an analog signal into a digital signal (an IQ signal) and transmits the digital signal to the REC, and the REC performs uplink digital signal processing.

However, when data is lost in transmission, the source device retransmits the data. Retransmission in the prior art increases a delay, and is inapplicable to a low-delay transmission system. For example, the CPRI specification has a high requirement of a delay, and a delay caused by retransmitting lost data is unacceptable.

SUMMARY

Embodiments of the present invention provide a data transmission method, which can reduce a packet loss rate requirement for a transmission system, so as to reduce transmission costs.

According to a first aspect, a data processing method is provided and includes:

obtaining, by a receiving device, a first data packet sequence, where the first data packet sequence includes a data packet that is in a source data packet sequence sent by a source device and that reaches the receiving device by using a transmission system, and the first data packet sequence is a subset of the source data packet sequence;

determining, by the receiving device according to an identifier of a data packet in the first data packet sequence, an identifier of a data packet lost in a transmission process of the transmission system;

determining, by the receiving device, an estimated value of the lost data packet according to a value of the data packet in the first data packet sequence;

combining, by the receiving device, the value of the data packet in the first data packet sequence with the estimated value of the lost data packet as a second data packet sequence corresponding to the source data packet sequence; and performing, by the receiving device, digital signal processing on the second data packet sequence.

According to a second aspect, a receiving device is provided and includes:

an obtaining unit, configured to obtain a first data packet sequence, where the first data packet sequence includes a data packet that is in a source data packet sequence sent by a source device and that reaches the receiving device by using a transmission system, and the first data packet sequence is a subset of the source data packet sequence;

a first determining unit, configured to determine, according to an identifier of a data packet in the first data packet sequence obtained by the obtaining unit, an identifier of a data packet lost in a transmission process of the transmission system;

a second determining unit, configured to determine, according to a value of the data packet in the first data packet sequence obtained by the obtaining unit, an estimated value of the lost data packet determined by the first determining unit;

a third determining unit, configured to combine the value of the data packet in the first data packet sequence obtained by the obtaining unit with the estimated value of the lost data packet determined by the second determining unit as a second data packet sequence corresponding to the source data packet sequence; and a processing unit, configured to perform digital signal processing on the second data packet sequence determined by the third determining unit.

According to a third aspect, a receiving device is provided and includes a processor and a communications interface, where the communications interface is configured to obtain a first data packet sequence, where the first data packet sequence includes a data packet that is in a source data packet sequence sent by a source device and that reaches the receiving device by using a transmission system, and the first data packet sequence is a subset of the source data packet sequence;

the processor is configured to determine, according to an identifier of a data packet in the first data packet sequence obtained by the communications interface, an identifier of a data packet lost in a transmission process of the transmission system;

the processor is further configured to determine an estimated value of the lost data packet according to a value of the data packet in the first data packet sequence obtained by the communications interface;

the processor is further configured to combine the value of the data packet in the first data packet sequence obtained by the communications interface with the estimated value of the lost data packet as a second data packet sequence corresponding to the source data packet sequence; and the processor is further configured to perform digital signal processing on the second data packet sequence.

According to a fourth aspect, a communications system is provided and includes the receiving device according to the third aspect or the fourth aspect.

In the embodiments of the present invention, a receiving device determines, according to an obtained first data packet sequence, a value of a data packet lost in a transmission process of a transmission system. This can reduce a packet loss rate requirement for the transmission system, so as to reduce transmission costs.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be noted that in the embodiments of the present invention, a source device or a receiving device may be any device that has a sending function and a receiving function, for example, may be any one of the following: a base station, user equipment (User Equipment, UE), a forwarder, or the like. This is not limited in the present invention.

Figure 1:
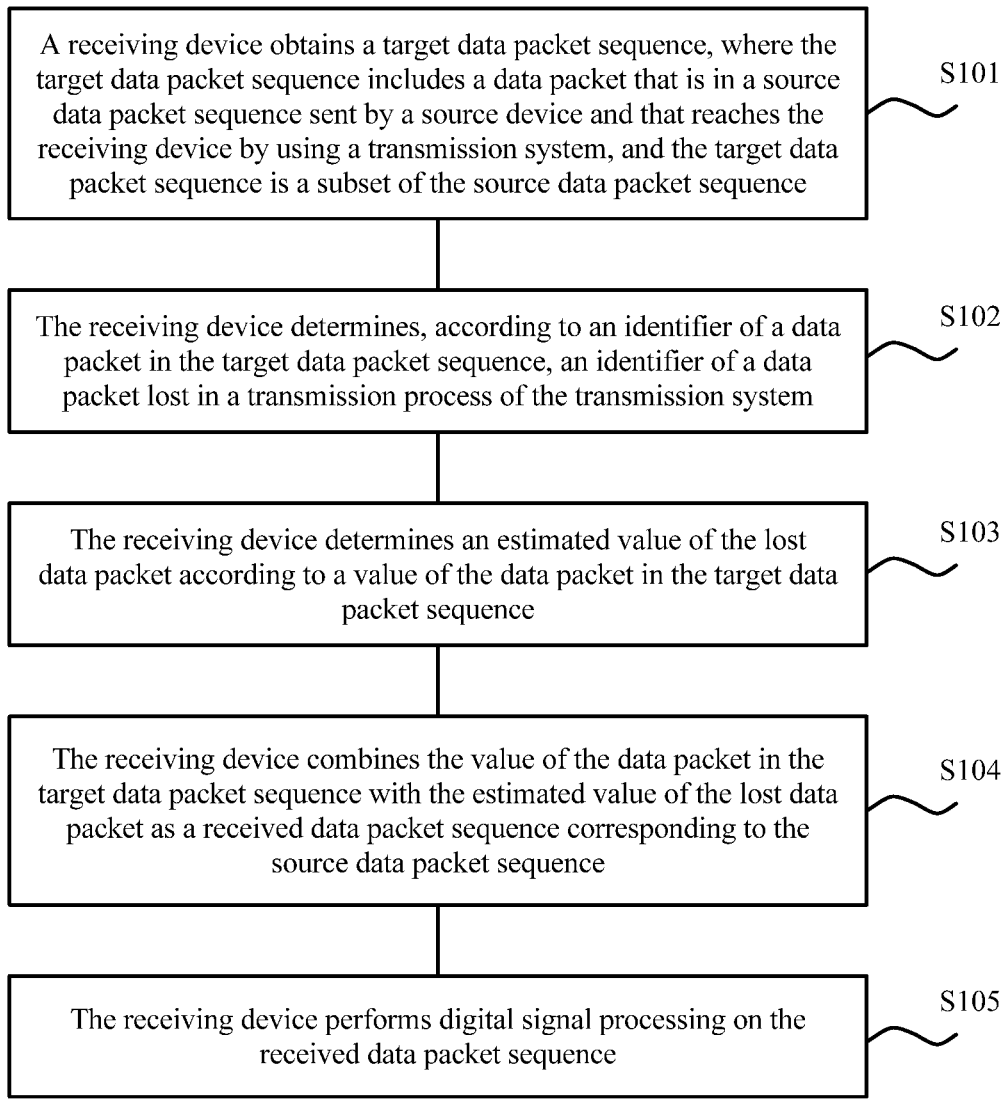
FIG. 1 is a flowchart of a data processing method according to an embodiment of the present invention.

FIG. 1 is a flowchart of a data processing method according to an embodiment of the present invention. The method shown in FIG. 1 includes the following steps.

S101: A receiving device obtains a first data packet sequence, where the first data packet sequence includes a data packet that is in a source data packet sequence sent by a source device and that reaches the receiving device by using a transmission system, and the first data packet sequence is a subset of the source data packet sequence.

S102: The receiving device determines, according to an identifier of a data packet in the first data packet sequence, an identifier of a data packet lost in a transmission process of the transmission system.

S103: The receiving device determines an estimated value of the lost data packet according to a value of the data packet in the first data packet sequence.

S104: The receiving device combines the value of the data packet in the first data packet sequence with the estimated value of the lost data packet as a second data packet sequence corresponding to the source data packet sequence.

S105: The receiving device performs digital signal processing on the second data packet sequence.

In this embodiment of the present invention, a receiving device determines, according to an obtained first data packet sequence, a value of a data packet lost in a transmission process of a transmission system. This can reduce a packet loss rate requirement for the transmission system, so as to reduce transmission costs.

It should be noted that in this embodiment of the present invention, data carried in a data packet is a digital signal that indicates analog signal amplitude, and specifically, may be a numerical value.

It may be understood that before S101, the source device converts an analog signal into a digital signal, and sends the digital signal to a target device in a form of data by using the transmission system. That the source device sends the digital device may be sending a data packet sequence continuously or periodically. In addition, the data packet sequence is multiple data packets that have an order. Herein, the data packet sequence sent by the source device is referred to as the source data packet sequence.

It may be understood that in this embodiment of the present invention, the receiving device is the target device of the data packet sent by the source device.

The source data packet sequence includes multiple data packets, and each data packet has a corresponding identifier. In addition, the order of the multiple data packets may be determined according to the identifiers corresponding to different data packets.

For example, the source data packet sequence may be a data packet sequence that has a number. The number herein is set by the source device according to a numbering rule that is pre-agreed with the receiving device and that is of a transmission order. Therefore, the source device may use the numbering rule to number (or encrypt) the data packets in the source data packet sequence, and then sends the data packets to the receiving device. Correspondingly, the receiving device may further determine a sending order according to the pre-agreed numbering rule of the transmission order.

For example, the source data packet sequence may be a data packet sequence that has a sequencing number. The source device may successively send the data packets according to an ascending order (from small to large) or a descending order (from large to small) of the numbers. Therefore, the numbers may also be understood as a time sequence, and values of the numbers may reflect a sequence of sending time. For example, it is assumed that the source device sends 10 data packets and respectively numbers the 10 data packets as 1 to 10 (or any other 10 unequal numbers). Subsequently, the source device successively sends the 10 data packets according to values of the numbers. For example, the source device may first send a data packet whose number is 1, then send a data packet whose number is 2, . . . , and so on, and finally send a data packet whose number is 10.

For another example, the source data packet sequence may be a data packet sequence that has time point information. The time point information may be a sending time point corresponding to a data packet, and the sending time point may be written when the source device sends the data packet. Therefore, the time point information may also be understood as a time sequence, and a value of the time point information may reflect a sequence of sending time. For example, it is assumed that the source device sends 10 data packets, and sending time points of the 10 data packets are successively $t_0+\Delta, t_0+2\Delta, \ldots,$ and $t_0+10\Delta$. Subsequently, the source device sends a corresponding data packet at a corresponding sending time point, and each data packet includes corresponding sending time point information as an identifier.

In this embodiment of the present invention, it is assumed that a data packet is lost in a process in which the transmission system transmits a digital signal. For example, the transmission system cannot process data packets in time due to congestion of the data packets, causing a loss of a data packet; or the transmission system is interfered by an external factor, causing a loss of a data packet; or an unstable factor such as thermal noise of the transmission system causes a loss of a data packet; or the like.

Herein, the loss of a data packet means that a quantity of data packets received by the receiving device is less than a quantity of data packets sent by the source device. For example, the source device sends 10 data packets, but the transmission system loses two data packets in a transmission process. As a result, the receiving device only receives eight data packets.

The transmission system herein may also be called a transmission network. The transmission network is not specifically limited in this embodiment of the present invention. For example, the transmission network may be a time division multiplexing (Time Division Multiplexing, TDM) network, or may be a packet-based network, or may be an optical fiber direct transmission network, or the like.

In this embodiment of the present invention, the first data packet sequence in S101 is a data packet sequence received by the receiving device. Due to the loss of a data packet (a packet loss) in the transmission process of the transmission system, the first data packet sequence is merely a part of the source data packet sequence.

Further, in S102, the receiving device may determine the identifier of the lost data packet according to the identifier of the received data packet.

For example, an identifier may be a number. If the receiving device fails to receive a next data packet within a preset time period after obtaining a data packet whose number is 10, and the data packet whose number is 10 does not include an end identifier, the receiving device determines that a data packet whose number is 11 is lost. It may be understood that if the receiving device still fails to receive a subsequent data packet within a next preset time period, the receiving device determines that a data packet whose number is 12 is lost, and so on, until the receiving device receives a data packet that includes the end identifier.

That is, in this embodiment, before receiving the end identifier, the receiving device may consider that the source device is always sending a data packet.

A form of the end identifier is not limited in this embodiment of the present invention. For example, the end identifier may be indicated by a specific field, or an all-zero data packet may be defined as the end identifier. Correspondingly, an all-one data packet may be defined as a start identifier, and vice versa.

Optionally, in S102, the receiving device may determine the identifier of the lost data packet according to whether identifiers are consecutive or not.

For example, the identifiers may be numbers. If numbers of data packets in the first data packet sequence are 1, 2, 3, 6, 7, 8, 9, and 10, and a data packet whose number is 10 includes the end identifier, the receiving device may determine that numbers of the lost data packets are 4 and 5.

Optionally, in S102, the receiving device may determine the identifier of the lost data packet according to the identifier of the received data packet and a quantity of data packets that is indicated by the source device.

The quantity of data packets that is indicated by the source device may be indicated before the source data packet sequence is sent, or may be indicated in a process of sending the source data packet sequence. This is not limited in the present invention.

For example, an identifier may be a number. If the source device indicates, to the receiving device, that the quantity of data packets in the sent source data packet sequence is 10, numbers of data packets in the first data packet sequence are 2, 3, 6, 7, 8, 9, and 10, and a data packet whose number is 10 includes the end identifier, the receiving device may determine that numbers of the lost data packets are 1, 4, and 5.

For example, an identifier may be a number. If the source device indicates, to the receiving device, that the quantity of data packets in the sent source data packet sequence is 10, numbers of data packets in the first data packet sequence are 1, 2, 3, 6, 7, 8, and 9, and a data packet whose number is 1 includes the start identifier, the receiving device may determine that numbers of the lost data packets are 4, 5, and 10.

In this embodiment of the present invention, for ease of description, it is assumed that the identifiers are consecutive numbers, and a data packet whose number is n may be indicated as $D_n$.

Further, in S103, the receiving device may determine the estimated value of the lost data packet by using a mathematical estimation method. For example, the mathematical estimation method may be a linear fitting method, or a curve fitting method, or a mathematical expectation method, or the like.

Expected values of values of all or some of the data packets in the first data packet sequence may be used as the estimated values of the lost data packets. Optionally, a data packet subsequence may be selected from the first data packet sequence, and an expected value of a value of a data packet in the data packet subsequence is used as the estimated value of the lost data packet. A manner for selecting the data packet subsequence is not limited in this embodiment of the present invention, and the data packet subsequence may be selected randomly, or according to a preset rule. For example, all or a part of the first data packet sequence may be used as the data packet subsequence. For example, expected values of $D_3$ and $D_6$ may be used as estimated values of $D_4$ and $D_5$.

According to a correspondence between the identifier of the data packet in the first data packet sequence and the value of the data packet in the first data packet sequence, a linear fitting method or a curve fitting method is used to estimate a value corresponding to the identifier of the lost data packet, and the corresponding value is used as the estimated value. The curve fitting method herein may be an exponential curve fitting method, for example, a quartic curve fitting method.

In this embodiment of the present invention, it is assumed that the source device sends k+i+j data packets, and the data packets are successively indicated as $D_{n-k}$, $D_{n-k+1}$, ..., $D_{n-1}$, $D_n$, ..., $D_{n+i-1}$, $D_{n+i}$, ..., and $D_{n+i+j-1}$.

Optionally, in an embodiment, if the first data packet sequence received by the receiving device in S101 includes first k data packets and last j data packets, that is, the identifiers of the data packets in the first data packet sequence are n−k, n−k+1, ..., n−1, and n+i, ..., and n+i+j−1, according to continuity of the identifiers, in S102, the receiving device may determine that the identifiers of the lost data packets are n, n+1, ..., and n+i−1, and the lost data packets may be called intermediate i data packets.

Subsequently, in S103, the receiving device may estimate values of the intermediate i data packets according to the received data packets. Numbers of the intermediate i data packets are n, n+1, ..., and n+i−1.

Specifically, the receiving device may use an estimation algorithm to estimate i values, and use the estimated i values as the values of the intermediate i data packets. The estimation algorithm may be the quartic curve fitting method or another estimation algorithm, and is not limited in the present invention. Some possible implementations are provided below.

(1) The receiving device may estimate the values of the intermediate i data packets according to the first k data packets and the last j data packets in S103.

For example, according to values of the first k data packets $D_{n-k}, D_{n-k+1}, \ldots,$ and $D_{n-1}$ and values of the last j data packets $D_{n+i}, \ldots,$ and $D_{n+i+j-1}$, a least square may be used to obtain a quartic curve, and i numerical values in the quartic curve that are corresponding to the numbers n, n+1, ..., and n+i−1 may be estimated. The estimated i numerical values are correspondingly used as estimated values $D_n, \ldots,$ and $D_{n+-1}$ of the intermediate i data packets that are not received.

Figure 2:
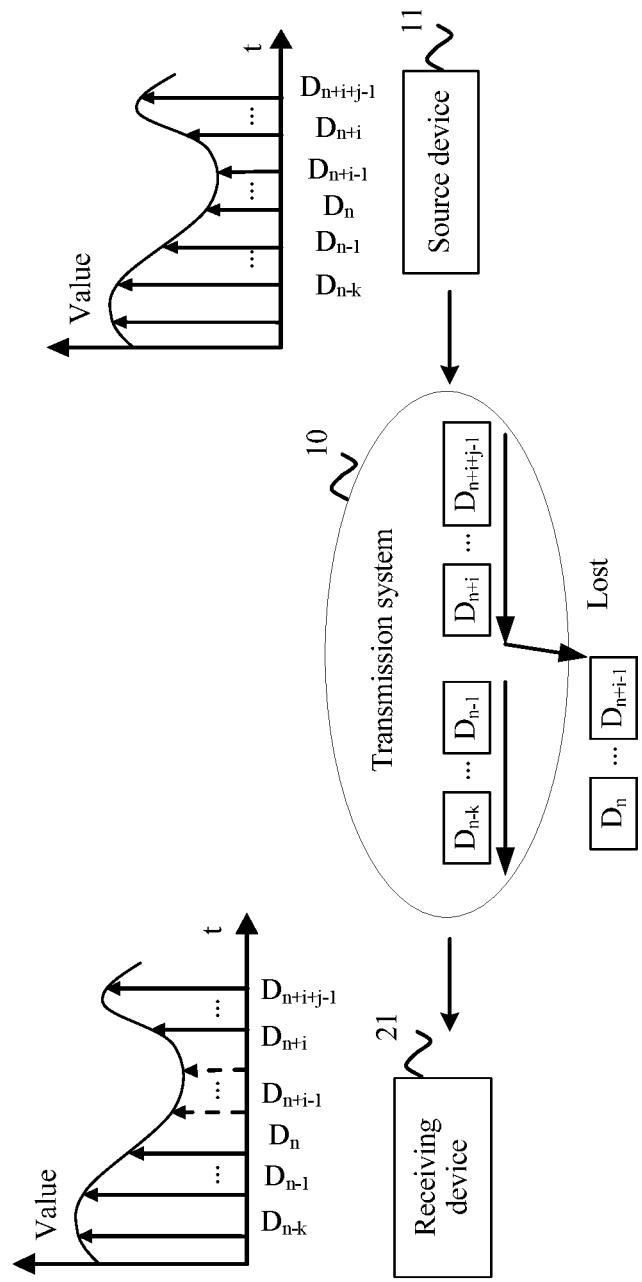
FIG. 2 is a schematic diagram of a scenario according to an embodiment of the present invention.

As shown in FIG. 2, a schematic diagram of an embodiment of the present invention is provided. A dashed line in a numerical coordinate on a receiving device side indicates that a corresponding value is obtained by estimation.

(2) The receiving device may estimate the values of the intermediate i data packets according to the first k data packets in S103.

For example, according to values of the first k data packets $D_{n-k}, D_{n-k+1}, \ldots,$ and $D_{n-1}$, a least square may be used to obtain a quartic curve, and i numerical values in the quartic curve that are corresponding to the numbers n, n+1, ..., and n+i−1 may be estimated. The estimated i numerical values are correspondingly used as estimated values $D_n, \ldots,$ and $D_{n+i-1}$ of the intermediate i data packets that are not received.

(3) The receiving device may estimate the values of the intermediate i data packets according to the last j data packets in S102.

For example, according to values of the last j data packets $D_{n+i}, \ldots,$ and $D_{n+i+j-1}$, a least square may be used to obtain a quartic curve, and i numerical values in the quartic curve that are corresponding to the numbers n, n+1, ..., and n+i−1 may be estimated. The estimated i numerical values are correspondingly used as estimated values $D_n, \ldots,$ and $D_{n+i-1}$ of the intermediate i data packets that are not received.

Optionally, in another embodiment, if the first data packet sequence received by the receiving device in S101 includes first k data packets and intermediate i data packets, that is, the identifiers of the data packets in the first data packet sequence are n−k, n−k+1, ..., n−1, n, n+1, ..., and n+i−1, according to continuity of the identifiers, in S102, the receiving device may determine that the identifiers of the lost data packets are n+i, ..., and n+i+j−1, and the lost data packets may be called last j data packets.

Therefore, the receiving device may estimate values of the last j data packets $D_{n+i}, \ldots,$ and $D_{n+i+j-1}$ according to the first k data packets and the intermediate i data packets. Alternatively, the receiving device may estimate estimated values of the last j data packets $D_{n+i}, \ldots,$ and $D_{n+i+j-1}$ according to values of the intermediate i data packets. Specifically, the quartic curve fitting method may be used for estimation. For a detailed description, refer to the description in the foregoing embodiment, and details are not described herein.

Optionally, in another embodiment, if the first data packet sequence received by the receiving device in S101 includes intermediate i data packets and last j data packets, that is, the identifiers of the data packets in the first data packet sequence are n, n+1, n+i−1, n+i, ..., and n+i+j−1, according to continuity of the identifiers, in S102, the receiving device may determine that the identifiers of the lost data packets are n−k, n−k+1, ..., and n−1, and the lost data packets may be called first k data packets.

Therefore, the receiving device may estimate values of the first k data packets $D_{n-k}, D_{n-k+1},$ and $D_{n-1}$ according to the intermediate i data packets and the last j data packets. Alternatively, the receiving device may estimate estimated values of the first k data packets $D_{n-k}, D_{n-k+1} \ldots,$ and $D_{n-1}$ according to values of the intermediate i data packets. Specifically, the quartic curve fitting method may be used for estimation. For a detailed description, refer to the description in the foregoing embodiment, and details are not described herein.

In this way, in this embodiment of the present invention, after estimating the estimated value of the lost data packet, in S104, the receiving device may combine the value of the first data packet sequence with the estimated value of the lost data packet as the second data packet sequence corresponding to the source data packet sequence, so that subsequent processing, such as the digital signal processing performed in S105, is performed on the second data packet sequence.

It can be seen that according to the method shown in this embodiment of the present invention, when a data packet is lost in a transmission process of a transmission system, a receiving device can determine an estimated value of the lost data packet, and this may have a relatively low packet loss rate requirement for the transmission system. In addition, a source device does not need to retransmit the data packet after the data packet is lost, and this can reduce resource usage of the transmission system, so as to reduce transmission costs.

Optionally, in S101, that a receiving device obtains a first data packet sequence may mean that the receiving device obtains the first data packet sequence within a preset time period. Specifically, a corresponding data packet is obtained in a preset time period corresponding to each data packet. The preset time period may be preconfigured by an administrator, or may be specified by the transmission system, and this is not limited in the present invention. For example, the preset time period may relate to a transmission delay.

It is assumed that the lost data packet determined by the receiving device in S102 includes a first data packet, that is, the first data packet fails to reach the receiving device within the preset time period. In practice, it may be that the transmission system loses the first data packet in the transmission process, and consequently, the first data packet is not received by the receiving device in S101. It may also be that the first data packet is transmitted extremely slowly due to a transmission system fault, and consequently, the first data packet fails to reach the receiving device within the preset time period.

It can be seen that in the latter possible situation above, the receiving device considers the first data packet as the lost data packet in S102, and calculates an estimated value of the first data packet in S103. However, in practice, the first data packet is only delayed to reach the receiving device, that is, the receiving device may obtain the first data packet after the preset time period. If the first data packet reaches the receiving device after S105, the receiving device discards the first data packet. If the first data packet reaches the receiving device before S105, that is, after S105, if the first data packet is received after the preset time period, the receiving device may replace the estimated value of the first data packet with a value of the first data packet.

It may be understood that before S105, the receiving device stores the first data packet sequence obtained in S101 and the calculated estimated value of the lost data packet in S103 into a receive buffer of the receiving device, to wait for subsequent processing.

It can be seen that if the receiving device obtains the first data packet after the preset time period and before S105, the estimated value of the first data packet in the receive buffer is replaced with the value of the first data packet.

That is, if a calculated estimated value of a data packet is still stored in the receive buffer of the receiving device, and a value of the data packet is received from the transmission system, the estimated value of the data packet in the receive buffer is deleted. Alternatively, it may be understood that the value of the data packet in the receive buffer is replaced with the received value.

For example, if the estimated value a1 of the first data packet is stored in the receive buffer of the receiving device, and the value a2 of the first data packet is obtained before subsequent processing is performed on the value a1, the estimated value a1 of the first data packet in the receive buffer is replaced with a2.

In addition, if packet replication occurs in the transmission system, the receiving device repeatedly receives a data packet. Therefore, the receiving device only receives the data packet received for the first time, and discards the subsequently repeated data packet. For example, after receiving a data packet P1, the receiving device receives the same data packet P1 again, and therefore directly and actively discards the same data packet P1 subsequently received.

Specifically, the receiving device may determine whether data packets are a same data packet according to identifiers. For example, in S101, after obtaining a data packet that has a first identifier, the receiving device discards a data packet that is subsequently obtained and that has the first identifier. This can avoid repeated reception, so as to reduce resource usage of the receiving device.

Figure 3:
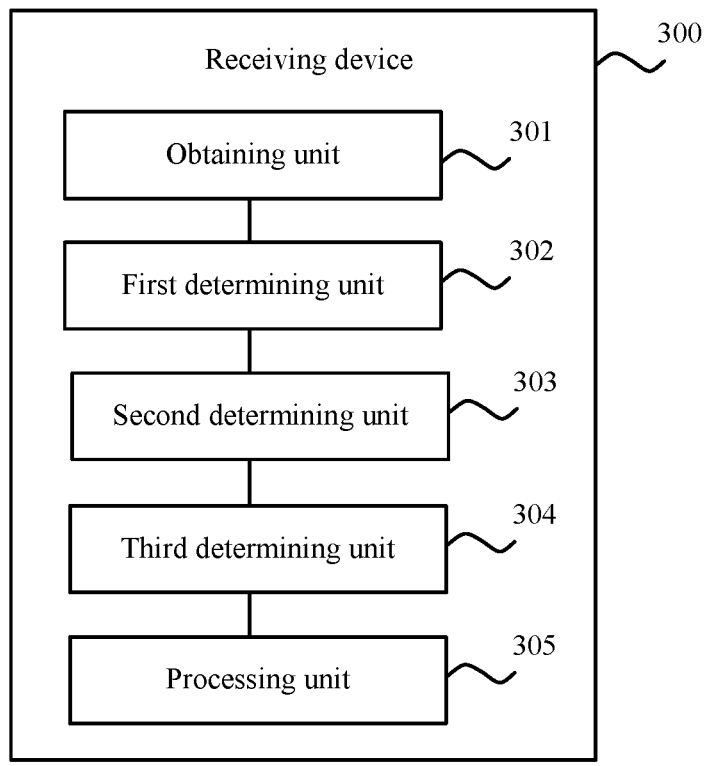
FIG. 3 is a block diagram of a receiving device according to an embodiment of the present invention.

FIG. 3 is a block diagram of a receiving device according to an embodiment of the present invention. A receiving device 300 shown in FIG. 3 includes an obtaining unit 301, a first determining unit 302, a second determining unit 303, and a processing unit 304.

The obtaining unit 301 is configured to obtain a first data packet sequence, where the first data packet sequence includes a data packet that is in a source data packet sequence sent by a source device and that reaches the receiving device by using a transmission system, and the first data packet sequence is a subset of the source data packet sequence.

The first determining unit 302 is configured to determine, according to an identifier of a data packet in the first data packet sequence obtained by the obtaining unit 301, an identifier of a data packet lost in a transmission process of the transmission system.

The second determining unit 303 is configured to determine, according to a value of the data packet in the first data packet sequence obtained by the obtaining unit 301, an estimated value of the lost data packet determined by the first determining unit 302.

The third determining unit 304 is configured to combine the value of the data packet in the first data packet sequence obtained by the obtaining unit 301 with the estimated value of the lost data packet determined by the second determining unit 303 as a second data packet sequence corresponding to the source data packet sequence.

The processing unit 305 is configured to perform digital signal processing on the second data packet sequence determined by the third determining unit 304.

In this embodiment of the present invention, a receiving device determines, according to an obtained first data packet sequence, a value of a data packet lost in a transmission process of a transmission system. This can reduce a packet loss rate requirement for the transmission system, so as to reduce transmission costs.

Optionally, in an embodiment, the lost data packet includes a first data packet, and the first data packet fails to reach the receiving device within a preset time period.

Optionally, in another embodiment, if the obtaining unit 301 receives the first data packet after the preset time period, the processing unit 305 may be further configured to replace an estimated value of the first data packet with a value of the first data packet.

Optionally, in another embodiment, the obtaining unit 301 is specifically configured to obtain a data packet that has a first identifier, and discard a data packet that is subsequently obtained and that has the first identifier. This can avoid repeated reception.

Optionally, in another embodiment, the second determining unit 303 is specifically configured to: according to a correspondence between the identifier of the data packet in the first data packet sequence and the value of the data packet in the first data packet sequence, use a linear fitting method or a curve fitting method to estimate a value corresponding to the identifier of the lost data packet, and use the corresponding value as the estimated value. The curve fitting method may be an exponential curve fitting method, for example, a quartic curve fitting method.

Optionally, in another embodiment, the second determining unit 303 is specifically configured to select a data packet subsequence from the first data packet sequence, and use an expected value of a value of a data packet in the data packet subsequence as the estimated value of the lost data packet.

Optionally, in another embodiment, the identifier is used to indicate an order of a data packet in the data packet sequence. For example, the identifier of the data packet is a number of the data packet, or the identifier of the data packet is a sending time point of the data packet.

Figure 4:
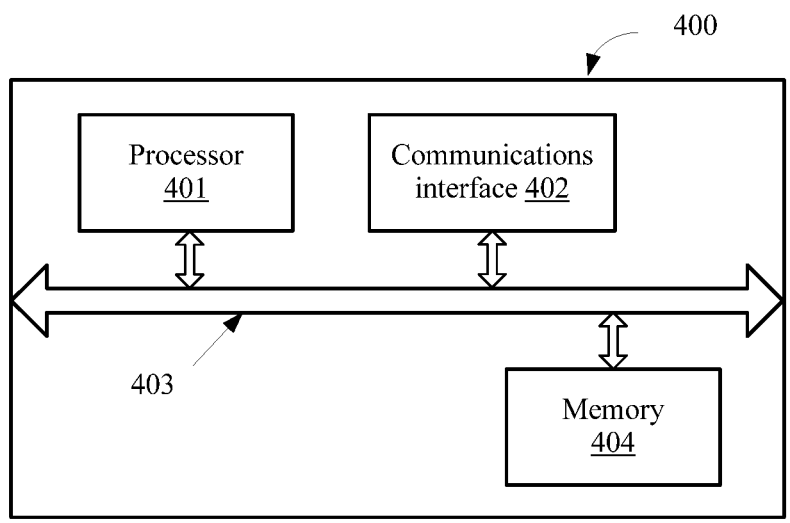
FIG. 4 is a block diagram of a receiving device according to another embodiment of the present invention.

It should be noted that in this embodiment of the present invention, the first determining unit 302, the second determining unit 303, and the processing unit 304 may be implemented by a processor, and the obtaining unit 301 may be implemented by a communications interface. As shown in FIG. 4, a receiving device 400 may include a processor 401, a communications interface 402, and a memory 404. The communications interface 402 may be a wired interface, or may be a wireless interface. For example, the communications interface 402 may include a network interface, a user interface, and the like. The memory 404 may be configured to store code or the like executed by the processor 401.

All components of the receiving device 400 are coupled together by using a bus system 403, where the bus system 403 further includes a power bus, a control bus, and a status signal bus in addition to a data bus.

The receiving device 300 shown in FIG. 3 or the receiving device 400 shown in FIG. 4 can implement each process implemented by the receiving device in the foregoing method embodiment shown in FIG. 1. To avoid repetition, details are not described herein.

It should be noted that the foregoing method embodiment of the present invention may be applied to a processor, or implemented by a processor. The processor may be an integrated circuit chip and has a signal processing capability. In an implementation process, each step of the foregoing method embodiment may be completed by using an integrated logic circuit of hardware in the processor or an instruction in a form of software. The foregoing processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or a transistor logic device, a discrete hardware component, or the like. The processor may implement or perform methods, steps, and logical block diagrams disclosed in the embodiments of the present invention. The general purpose processor may be a microprocessor, or the processor may be any normal processor, or the like. The steps of the methods disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that a memory in the embodiments of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) that is used as a high-speed external cache. According to description that is used as an example instead of a limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that a purpose of the memory in the system and the method that are described in this specification is to include but is not limited to these and a memory of any other proper type.

In addition, an embodiment of the present invention provides a communications system, and the system may include the receiving device 300 or the receiving device 400. It may be understood that the system may further include another device or the like for assisting in implementing a function of the receiving device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method, comprising:
   obtaining, by a receiving device, a first data packet sequence, wherein the first data packet sequence comprises a data packet that is in a source data packet sequence sent by a source device and that reaches the receiving device by using a transmission system, and the first data packet sequence is a subset of the source data packet sequence;

determining, by the receiving device according to an identifier of a data packet in the first data packet sequence, an identifier of a data packet lost in a transmission process of the transmission system;

determining, by the receiving device, an estimated value of the lost data packet according to a value of the data packet in the first data packet sequence, wherein the estimated value of the lost data packet corresponds to an analog signal amplitude indicated by the lost data packet, and the value of the data packet in the first data packet sequence corresponds to an analog signal amplitude indicated by the data packet in the first data packet sequence;

combining, by the receiving device, the value of the data packet in the first data packet sequence with the estimated value of the lost data packet as a second data packet sequence corresponding to the source data packet sequence; and performing, by the receiving device, digital signal processing on the second data packet sequence.

2. The method according to claim 1, wherein the lost data packet comprises a first data packet, and the first data packet fails to reach the receiving device within a preset time period.

3. The method according to claim 2, wherein before the performing digital signal processing on the second data packet sequence, the method further comprises:
if the first data packet is received after the preset time period, replacing an estimated value of the first data packet with a value of the first data packet.

4. The method according to claim 1, wherein the obtaining a first data packet sequence comprises:
obtaining a data packet that has a first identifier; and
discarding a data packet that is subsequently obtained and that has the first identifier.

5. The method according to claim 1, wherein the determining an estimated value of the lost data packet according to a value of the data packet in the first data packet sequence comprises:
according to a correspondence between the identifier of the data packet in the first data packet sequence and the value of the data packet in the first data packet sequence, using a linear fitting method or a curve fitting method to estimate a value corresponding to the identifier of the lost data packet, and using the corresponding value as the estimated value.

6. The method according to claim 5, wherein the curve fitting method is a quartic curve fitting method.

7. The method according to claim 1, wherein the determining an estimated value of the lost data packet according to a value of the data packet in the first data packet sequence comprises:
selecting a data packet subsequence from the first data packet sequence; and
using an expected value of a value of a data packet in the data packet subsequence as the estimated value of the lost data packet.

8. The method according to claim 1, wherein the identifier is used to indicate an order of a data packet in the data packet sequence; and
the identifier of the data packet is a number of the data packet, or the identifier of the data packet is a sending time point of the data packet.

9. A receiving device, comprising:
a communications interface configured to obtain a first data packet sequence, wherein the first data packet sequence includes a data packet that is in a source data packet sequence sent by a source device and that reaches the receiving device by using a transmission system, and the first data packet sequence is a subset of the source data packet sequence; and
a processor configured to:
determine, according to an identifier of a data packet in the first data packet sequence obtained by the communications interface, an identifier of a data packet lost in a transmission process of the transmission system,
determine an estimated value of the lost data packet according to a value of the data packet in the first data packet sequence obtained by the communications interface, wherein the estimated value of the lost data packet corresponds to an analog signal amplitude indicated by the lost data packet, and the value of the data packet in the first data packet sequence corresponds to an analog signal amplitude indicated by the data packet in the first data packet sequence,
combine the value of the data packet in the first data packet sequence obtained by the communications interface with the estimated value of the lost data packet as a second data packet sequence corresponding to the source data packet sequence, and
perform digital signal processing on the second data packet sequence.

10. The receiving device according to claim 9, wherein the lost data packet comprises a first data packet, and the first data packet fails to reach the receiving device within a preset time period.

11. The receiving device according to claim 10, wherein if the communications interface receives the first data packet after the preset time period, the processor is further configured to replace an estimated value of the first data packet with a value of the first data packet.

12. The receiving device according to claim 9, wherein the communications interface is configured to:
obtain a data packet that has a first identifier; and
discard a data packet that is subsequently obtained and that has the first identifier.

13. The receiving device according to claim 9, wherein the processor is configured to:
according to a correspondence between the identifier of the data packet in the first data packet sequence and the value of the data packet in the first data packet sequence, use a linear fitting method or a curve fitting method to estimate a value corresponding to the identifier of the lost data packet, and use the corresponding value as the estimated value.

14. The receiving device according to claim 13, wherein the curve fitting method is a quartic curve fitting method.

15. The receiving device according to claim 9, wherein the processor is configured to:
select a data packet subsequence from the first data packet sequence; and
use an expected value of a value of a data packet in the data packet subsequence as the estimated value of the lost data packet.

16. The receiving device according to claim 9, wherein the identifier is used to indicate an order of a data packet in the data packet sequence; and
the identifier of the data packet is a number of the data packet, or the identifier of the data packet is a sending time point of the data packet.

* * * * *